United States Patent [19]
Christopher

[11] Patent Number: 5,130,798
[45] Date of Patent: Jul. 14, 1992

[54] DUAL BAND PROGRESSIVE TELEVISION SYSTEM WITH NOISE REDUCTION

[75] Inventor: Todd J. Christopher, Indianapolis, Ind.

[73] Assignee: Thomson Consumer Electronics, Inc., Indianapolis, Ind.

[21] Appl. No.: 648,783

[22] Filed: Jan. 31, 1991

[51] Int. Cl.⁵ ........................ H04N 7/01; H04N 5/213
[52] U.S. Cl. .................................... 358/140; 358/167
[58] Field of Search ................. 358/140, 36, 39, 167

[56] References Cited

U.S. PATENT DOCUMENTS

| | | | |
|---|---|---|---|
| 4,163,258 | 7/1979 | Ebi Hara et al. | 358/167 |
| 4,246,610 | 1/1981 | Takahashi | 358/167 |
| 4,523,230 | 6/1985 | Carlson et al. | 358/167 |
| 4,623,913 | 11/1986 | Fling et al. | 358/140 X |
| 4,639,783 | 1/1987 | Fling | 358/166 |
| 4,672,445 | 6/1987 | Casey et al. | 358/140 |
| 4,870,482 | 9/1989 | Yasuki et al. | 358/36 |
| 5,025,312 | 6/1991 | Faroudja | 358/36 |

FOREIGN PATENT DOCUMENTS

58-79379 5/1983 Japan.

*Primary Examiner*—James J. Groody
*Assistant Examiner*—Mark R. Powell
*Attorney, Agent, or Firm*—Joseph S. Tripoli; Peter M. Emanuel; Richard G. Coalter

[57] ABSTRACT

An input filter separates a luminance input signal into a high frequency component that is noise reduced by coring and a low frequency component that is noise reduced by a frame recursive filter preceded by sub-sampling and followed by sample rate restoration by interpolation. An output circuit combines the noise reduced components to provide a processed output signal in which high frequency portions thereof are subjected to coring and low frequency portions thereof are subjected to recursive filtering. In a specific application the frame recursive filter provides a plurality of low frequency sub-sampled components which are combined with the processed output signal in a further output circuit to provide a noise reduced output signal of progressive scan form.

3 Claims, 9 Drawing Sheets

DUAL BAND PROGRESSIVE TELEVISION SYSTEM WITH NOISE REDUCTION

RELATED APPLICATIONS

A U.S. patent application Ser. No. 648,782, entitled VIDEO NOISE REDUCTION SYSTEM EMPLOYING PLURAL FREQUENCY BANDS, filed concurrently herewith by the present inventor, discloses subject matter common to the present application.

FIELD OF THE INVENTION

This invention relates to video noise reduction systems and particularly to systems of a type employing plural frequency bands.

BACKGROUND OF THE INVENTION

Video noise reduction systems of a type which separate a video signal into two or more frequency bands for purposes of noise reduction are well known. FIG. 1 of U.S. Pat. No. 4,163,258 entitled NOISE REDUCTION SYSTEM which issued Jul. 31, 1979 to Ebihara et al. describes a known "plural frequency band" noise reduction system of the "simple coring" type. In the Ebihara et al. system a video input signal is split into high and low frequency bands by complementary high and low pass filters, the high frequency portion is cored and the bands are then recombined to provide a noise reduced video output signal in which the high frequency components thereof are "cored" and the low frequency components thereof are not disturbed or altered in any way.

One disadvantage of such a dual-band system, as explained by Ebihara et al., is that the high pass and low pass filters used to separate the video signal generally impart unequal phase shifts to the signals applied thereto and this results in phase distortion when the low frequency components are recombined with the cored high frequency components. Ebihara et al. also point out that the amplitude-frequency characteristics of such filters generally are not equal. Ebihara et al. conclude that, because of the different phase-shifts and the different amplitude characteristics in the recombined lower frequency and higher frequency components attributed to theses filters, the resultant video signal exhibits significant distortion which is detectable in the reproduced video signal. It will be further noted that the two-band coring arrangement provides no signal to noise ratio improvement for the low frequency component of the video signal being processed.

To overcome the problems noted above with conventional coring type noise reduction systems, Ebihara et al. propose a multi-band noise reduction system in which the video signal is first converted to number of time coincident samples, then transformed (by Hadamard transforms) into plural frequency bands with coring applied to all but the lowest frequency band, whereupon the processed signals are applied to an inverse-Hadamard transform matrix and are finally re-combined to provide a noise reduced video output signal. A disadvantage of such a system is that it is relatively complex.

Other workers in the noise reduction field have also attempted to improve upon the "simple" form of coring system noted above by using other forms of transforms. U.S. Pat. No. 4,523,230 entitled SYSTEM FOR CORING AN IMAGE-REPRESENTATIVE SIGNAL of Carlson et al. which issued Jun. 11, 1985 describes a multi-band spatial frequency coring system. In a preferred embodiment therein disclosed, spatial frequency transforms of the so-called "Burt Pyramid" type are used in combination with plural spatial frequency band coring. Briefly, an input signal to be noise reduced is first applied to a non-ringing, non-aliasing, localized trransfer, octave band spatial frequency spectrum analyzer which separates the video input signal into subspectra signals. Next, the subspectra signals are individually cored. Finally, the cored subspectra signals are applied to a synthesizer employing one or more non-ringing, non-aliasing filters for deriving an output image-representative signal from all of the subspectra signals. Such a system, as compared with simple coring as described above, is also relatively complex.

An alternative to the foregoing multi-band noise reduction systems is to employ single band processing. An elementary single band processor comprises just a low pass filter. Such a system, while having the virtue of simplicity, tends to remove signal as well as noise and results in a "soft" appearing picture lacking in detail even for cases where there is no noise at all.

A single band noise reduction system that is effective for improving the overall signal to noise ratio of video signals having little or no frame-to-frame motion is the well known "recursive" filter technique wherein signal to noise ratio is enhanced by frame to frame correlation methods. Briefly, (for the case of still images) by combining a number of frame delayed signals in an accumulator the signal power of the sum increases more quickly than the noise power. This results because the signal of still images is coherent from frame to frame whereas the noise is not coherent on a frame to frame basis. Accordingly, frame recursive filtering provides a real signal to noise ratio improvement for images having little or no motion. Several examples of motion adaptive frame recursive filters are described by Takahashi in U.S. Pat. No. 4,246,610 entitled NOISE REDUCTION SYSTEM FOR COLOR TELEVISION SIGNAL which issued Jan. 20, 1981. On the other hand, frame recursive filtering, as it has heretofore been implemented, requires a substantial amount of memory to implement the required frame delay.

SUMMARY OF THE INVENTION

The present invention resides in part in the recognition of a need for a video noise reduction system capable of providing a signal to noise ratio enhancement while having relatively modest requirements for video memory.

Video noise reduction apparatus embodying the invention includes a source for providing a digital video input signal having a given sampling rate. An input signal processor separates the video input signal into a high frequency component of the given sample rate and a sub-sampled low frequency component having a lower sample rate. A frame recursive filter applies frame recursive filtering to the sub-sampled low frequency component. An output processor applies coring to the high frequency component, restores the sample rate of the frame recursively filtered low frequency component and combines the resultant components to provide a noise reduced digital video output signal.

In an exemplary application of the principles of the invention the frame recursive filter provides a plurality of low frequency sub-sampled components which are processed and combined with the output of the noise reduction apparatus to provide a video output

BRIEF DESCRIPTION OF THE DRAWING

The foregoing and further features of the invention are described in detail hereinafter and shown in the accompanying drawing wherein like elements are denoted by like reference designators and in which.

DETAILED DESCRIPTION

Figure 1:
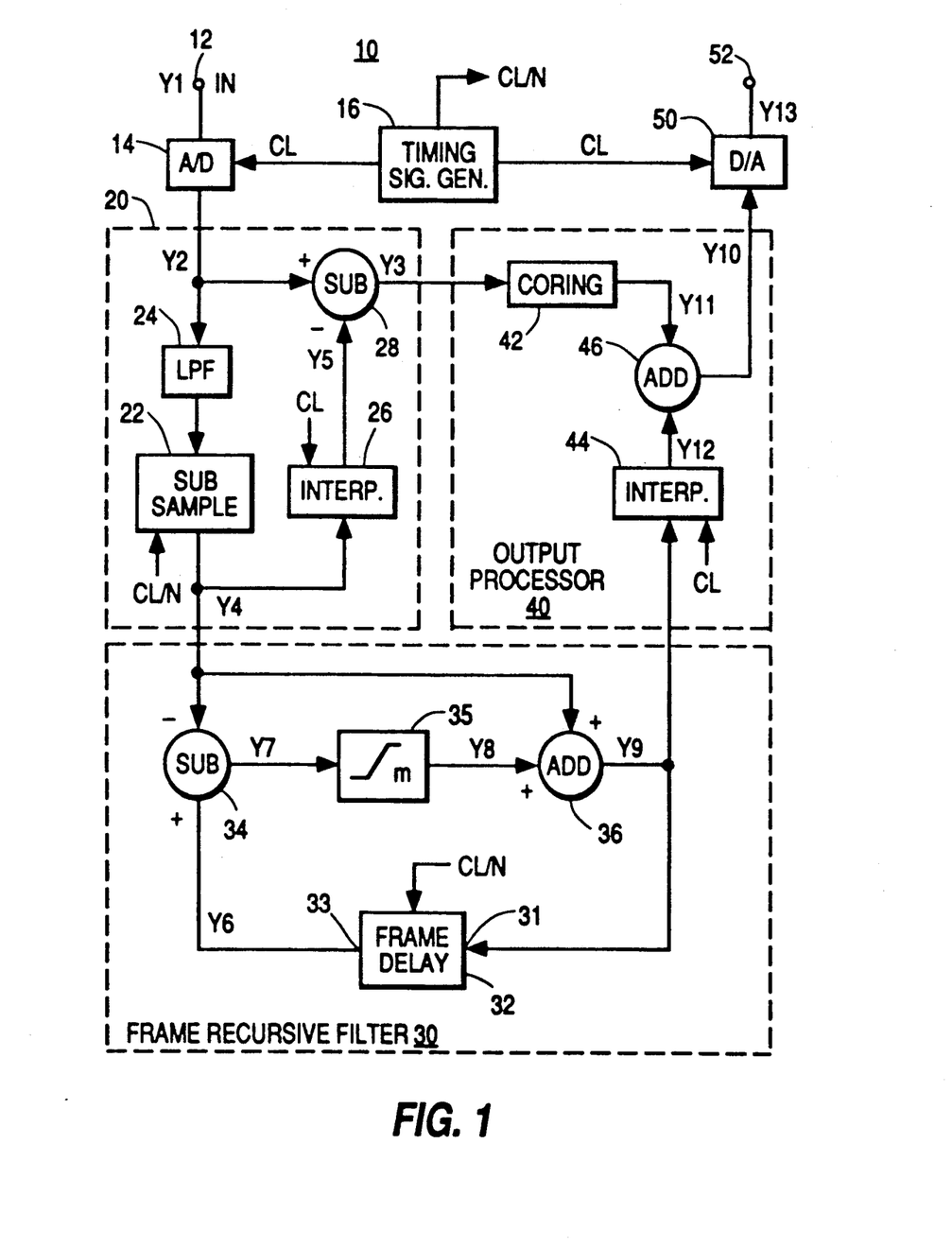
FIG. 1 is a block diagram of a noise reduction system embodying the invention.

The video noise reduction system 10 of FIG. 1 reduces noise of luminance signals by subjecting high frequency luminance signal components to coring and subjecting low frequency luminance signal components to frame recursive filtering. The memory requirements for the frame recursive filtering are greatly reduced by sub-sampling the low frequency component before recursive filtering and then restoring the sample rate of the filtered signal to its original value (preferably by interpolation) after recursive filtering. Memory savings result because there are fewer samples per line of the signal stored to implement the full field delay required for field recursive filtering.

Advantageously, in the specific example of the invention of FIG. 1, the memory savings achieved amount to seventy five percent (75%) of the memory which would otherwise be required for implementing recursive filtering using the sampling rate of the video input signal. Memory savings of this substantial amount not only provide an obvious economic benefit but also provide a technical benefit as well in terms of improved reliability since the sub-sampled system delay requires are far fewer memory cells and thus there are fewer possibilities for memory cell failure.

It is a further feature of the noise reduction system 10 of FIG. 1 that the system is of general utility. For example, it may be used in reducing noise in the luminance channel of a television receiver, a camera or a broadcast transmitter. Other useful applications include reducing luminance signal noise in the record or playback circuits of a video cassette recorder (VCR) or a video tape recorder (VTR).

Additional benefits of the invention are obtained in video processing systems wherein a luminance signal band is split into high and low frequency components for purposes other than noise reduction. Examples of such systems are described and discussed later with regard to the example of FIG. 2 of the drawing. As will be seen, the memory savings for implementing field and frame delayed signals in such applications is very high because of the possibility of shared use of common signals.

In FIG. 1, an analog luminance input signal Y1, to be noise reduced, is applied to the input terminal 12 of an analog to digital (A/D) converter 14 which receives clock signals CL from a timing signal generator 16. Converter 14 samples the analog luminance signal Y1 and provides a digital luminance output signal Y2 having a sample rate equal to the frequency of the clock signal C1 provided by timing signal generator 16.

It is customary practice in digitizing video signals to utilize phase lock loop (PLL) techniques to provide sampling or "clock" frequencies related to a periodic parameter of the video signal. In so-called "burst locked" systems, the sampling signal is usually selected to be an integer multiple (usually 3 or 4) of the signal color burst frequency. In so-called "line locked" systems, the sampling signal is usually selected to be a multiple of the horizontal line rate of the video input signal. Either "line locked clocking" or "burst locked clocking" may be used in practising the invention. In this specific example it will be assumed that the timing signal generator 16 is a phase lock loop (PLL) locked to a frequency of 1024 times the horizontal line frequency of the luminance input signal Y1. Such a generator may be constructed by applying the horizontal synchronizing component of luminance signal Y1 to a conventional PLL having an divider in its VCO feedback path as is well known.

It will also be assumed that the horizontal line frequency of signal Y1 is of the NTSC color standard having a line frequency of 15734 Hz. Accordingly, in this example of the invention, the sample or clock rate (CL) of the digitized luminance signal Y will equal 16.111616 MHz. For simplicity in the following description, the sample rate or clock frequency CL will hereafter be referred to as being about 16 MHz. Timing signal generator 16 also provides a second clock output frequency equal to CL/N wherein N is an integer. This clock signal, as will be explained, is used for sub-sampling purposes and well as in frame delay clocking. In this specific example the integer N will be assumed to be four (4) and so the sub-sampling clock frequency CL/N will be about 4 MHz.

Briefly reviewing the foregoing, analog to digital converter 14, in combination with timing signal generator 16, serves as a source that provides a digital video input signal (e.g., luminance signal Y2) having a given sampling rate (e.g., about 16 MHz) to be noise reduced.

The digital video input signal Y2 is applied to an input signal processor 20 (outlined in phantom) which separates the luminance input signal Y2 into a high frequency component Y3 having the given sample rate (16 MHz) and a sub-sampled, low frequency component Y4 having a lower sampling rate. In this case the lower sampling rate is one-fourth of the original rate or about 4 Mhz.

More specifically, in processor 20 the luminance signal Y2 which has a sample rate of 16 MHz is applied to a sub-sampling circuit 22 by means of a low-pass filter 24. Sub-sampling circuit 22 is clocked at a rate of CL/4 (about 4 MHz) and greatly reduces the luminance signal data rate and thus reduces the number of bytes of memory required for implementing video delay functions performed later. As an example, if the full bandwidth luminance signal Y1 is digitized at the assumed clock rate of 16 MHz and then sub-sampled at the assumed 4 MHz clock rate, then only one-quarter (e.g., 25%) of the memory will be needed to implement the same digital delay as would otherwise be required if the signal were not sub-sampled. One may, as previously explained, select other clock rates and sub-sampling rates in a specific application of the principles of the invention.

To avoid aliasing, the sub-sampled luminance signal is low pass filtered prior to sub-sampling and this function is provided by low pass filter 24. The maximum cut-off frequency for filter 24 (i.e., the "Nyquist" frequency) is one-half of the sub-sampling rate (e.g., about 2 MHz for the assumed sub-sampling rate of about 4 MHz.) It is desirable, however, that the filter cut-off or "corner" frequency be lower than half the sub-sampling rate to allow for the finite slope of the filter response in the transition region between the filter pass band and the filter stop band. An exemplary cut-off frequency, for the assumed sampling frequency is about 1.5 MHz for 6 dB of attenuation at band edge. This frequency is well below the Nyquist frequency of about 2 MHz for the assumed sub-sampling rate of about 4 MHz. Advantageously, this reduces the number of filter elements needed to implement the anti-aliasing low pass filter 24. For applications where the sub-sampling rate is higher, then proportionally higher anti-aliasing filter cut-off frequencies may be used.

Separation of the high frequency component Y3 from the luminance input signal Y2 is accomplished in processor 20 by the steps of (1) converting the sample rate of the sub-sampled signal Y4 to equal the sample rate (16 MHz) of the input luminance signal Y2 and (2) subtracting the resultant converted signal Y5 from the digital video input signal Y2. These functions are performed, as shown, by an interpolator 26 and a subtractor 28. The interpolator 26 provides sample rate conversion of the signal Y4 to the sample rate of the signal Y2 by four point linear interpolation, examples of which are described later. The difference signal Y3 produced by subtractor 28 therefore has a sampling rate of 16 MHz and represents components of the luminance input signal Y2 above the cut-off frequency of low pass filter 24.

It is a feature of the invention that the process of obtaining the high frequency component of the luminance signal Y2 is obtained by sub-sampling a low frequency component of signal Y2, interpolating the sample rate of the resultant signal to the original sample rate and subtracting the resultant signal (Y5) from the original signal Y2 to provide the separated high frequency component Y3. This technique of separating a high frequency component of an input signal appears, upon first consideration, to be rather complex in view of the conventional techniques of signal separation. As will now be explained, however, the new signal separation technique (exemplified by processor 20) has several distinct advantages over conventional signal separation techniques. One advantage, over the conventional technique of using "matched" high and low pass filters, is that a single filter (i.e., 24) determines both of the corner frequencies of the separated signals Y3 and Y4 exactly without need for a pair of filters having matched amplitude and phase responses. Specifically, the high frequency limit for the low passed signal Y4 will be equal to the 1.5 MHz cut-off frequency of filter 24 and the low frequency limit for the high frequency component Y3 will also, ndue to the subtraction) equal the 1.5 MHz cut-off frequency of filter 24.

After signal separation, as described above, the separated and sub-sampled low frequency component Y4 is applied to a frame recursive filter 30 (outlined in phantom) which frame recursively filters signal Y4. Conventional frame recursive filters may be used for this purpose. However, to achieve the benefits of the present invention is it necessary that the frame memory be clocked at the sub-sampling clock rate CL/N. Examples of motion adaptive frame recursive filters which may be modified for use in the present invention are described, for example, by Takahashi in U.S. Pat. No. 2,246,610 entitled NOISE REDUCTION SYSTEM FOR COLOR TELEVISION SIGNAL which issued Jan. 20, 1981. Modifications necessary to the filters described by Takahashi include removal of color processing circuitry and reduction of the frame memory clock rate to the sub-sampling clock rate (with a corresponding reduction in the number of frame memory storage locations).

Filter 30 of FIG. 1 is a preferred from of recursive frame filter which features simplified motion adaption. In conventional motion adaptive frame recursive filters (such as those described by Takahashi, above) multiplication or variable attenuation is required in the filter loop. Advantageously, this complexity is avoided completely in the illustrated example.

In more detail, filter 30 includes a clocked frame delay unit or memory 32 having an input 31 and an output 32 and which receives clocking signals at the sub-sampling clock rate of CL/N (e.g., 4 MHz). A subtractor 34 subtracts the sub-sampled low frequency component input signal Y4 from a frame-delayed output signal Y6 to provide a difference signal Y7 which is applied to a limiter 35. A motion adapted noise reduced output signal Y9 is produced by an adder 36 which adds the signals Y8 and Y4 to produce the noise reduced signal Y9 which, in turn, is applied to the input 31 of frame delay unit 32.

Operation of the frame recursive filter 30 is as follows. The subtractor 34 produces the difference (Y7) between the incoming luminance low frequency component (Y4) and the frame delayed noise reduced component (Y6). Limiter 35 passes this difference (Y8) if it is small (i.e., there is little or no motion) and the difference signal Y8 is added by adder 36 to the input signal Y4. As a result, the input signal Y4 is mostly cancelled and replaced by the frame delayed signal Y6. However, when motion is present, the output of subtractor 34 will be a relatively large signal. Accordingly, limiter 35 will limit the signal Y7 thereby causing the incoming signal (Y4) to be used almost exclusively since the difference signal Y8 will be limited by limiter 35. For this to occur, limiter 35 has a gain selected to be less than unity when it is not limiting (e.g., the limiter "small signal" gain) so that the memory 33 contents always converge towards the average of the input signal Y4. An exemplary gain for limiter 35 is seven-eighths (7/8).

An output signal processor 40 is coupled to the input signal processor 20 and to the frame recursive filter 30 for providing a broad band noise reduced luminance output signal Y10. To this end, processor 40 provides the triple functions of (1) forming the high frequency component, (2) restoring the sample rate of the frame recursively filtered low frequency component and (3) combining the resultant low and high frequency components to from the broad-band noise reduced (digital) luminance output signal Y10.

In more detail, processor 40 includes a coring circuit 42 which passes large signal variations of the high frequency component Y3 and suppresses small signal variations of signal Y3 to provide a cored high frequency luminance output signal Y11. In this manner, low level, high frequency noise present in the component Y3 is removed. Conventional coring circuits may be used for this purpose. The noise reduced low frequency subsampled luminance component Y9 is applied to an interpolator 44 which restores the sample rate from CL/4 (e.g., 4 MHz) to CL (e.g., 16 MHz). Preferably this is done by four point linear interpolation as is the case with the interpolator 26 in input processor 20. As a general rule, the number of points used in sample rate conversion are preferably at least equal to the sub-sampling factor N. In this example, the sub-sampling factor is 4-to-1 and the interpolators selected (26 and 44) for sample rate up-conversion are four point linear interpolators. Examples are given later. If the sub-sampling rate is changed to 5-to-1, a five point linear interpolator would be indicated. In general, it is desirable that the interpolation be provided by at least as many samples as the sub-sampling factor although more samples may be used if desired.

Figure 2:
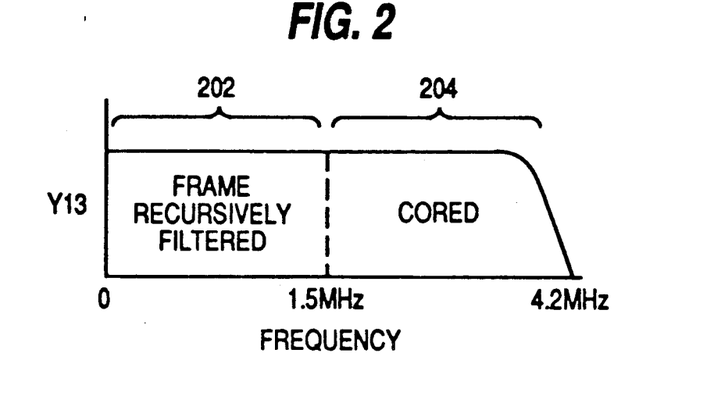
FIG. 2 is a spectrum diagram illustrating regions of coring and frame recursive filtering provided by the noise reduction system of FIG. 1.

The final element of output processor 40 comprises an adder 46 which adds the noise reduced (cored), high frequency, luminance component Y11 to the noise reduced (recursively filtered) sample rate converted, low frequency component Y12. As illustrated in FIG. 2, the resultant noise reduced luminance signal Y10 has the full bandwidth of the original luminance input signal (e.g., Y1 analog or Y2 digital) with the high frequency portion thereof (304) from 1.5 MHz to 4.2 Mhz being noise reduced by coring and the low frequency portion thereof (302) from zero to 1.5 MHz being noise reduced by frame recursive filtering. A digital to analog converter 50, clocked by the full rate clock signals CL (16 MHz in this example) is coupled to the output of adder 46 for providing an analog output signal Y13 (at output 52) corresponding to the noise reduced digital output signal Y10. The converter 50 is optional and may be omitted in applications, such as one described later, where the digital signals are to be subjected to further digital signal processing.

Figure 3:
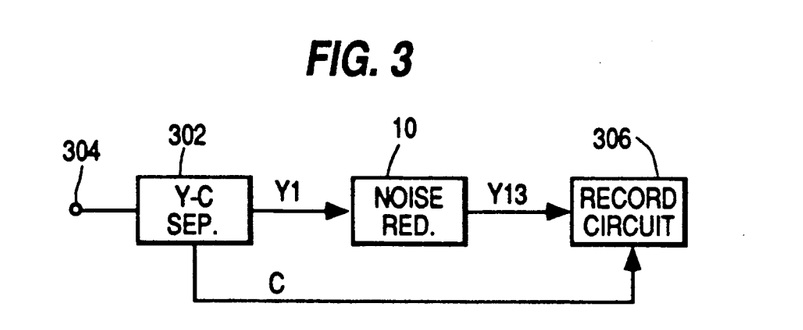
FIG. 3 is a simplified block diagram illustrating use of the noise reduction system of FIG. 1 in the record portion of a video cassette or tape recorder.
Figure 4:
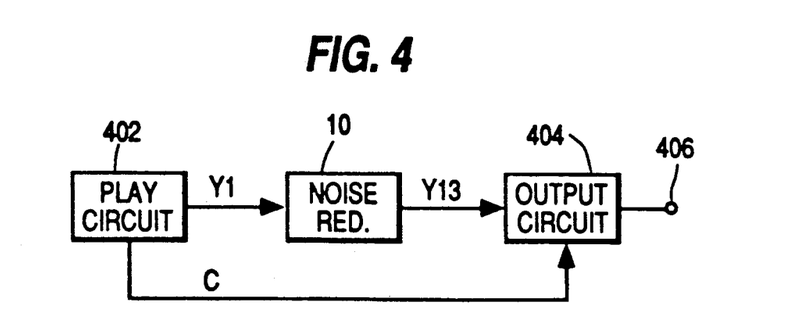
FIG. 4 is a simplified block diagram illustrating use of the noise reduction system of FIG. 1 in the plackback portion of a video cassette or tape recorder.

There has been shown and described thus far a video noise reduction system of general utility wherein high frequency components are subjected to coring and low frequency components are subjected to frame recursive filtering and having the advantages previously described. FIGS. 3 and 4 are exemplary of general applications of the principles of the invention.

FIG. 3 illustrates application to the record circuits of a video cassette recorder (VCR) or video tape recorder (VTR). In FIG. 3 a video input signal to be noise reduced prior to recording is applied to the input 304 of a luminance-chrominance signal separator 302 which separates the input signal into luminance and chrominance components Y1 and C1. These components are coupled via respective paths to the VCR or VTR record circuit unit 304. The noise reduction system 10 (of FIG. 1) is interposed in the luminance signal path for recursively filtering low frequency luminance components and coring high frequency luminance components in the luminance signal path. The chrominance signal path may, optionally, include noise reduction apparatus as well.

FIG. 4 illustrates application of the invention to the playback circuits of a VCR or VTR. In FIG. 4 playback circuit 402 recovers luminance Y1 and chrominance C1 components from a tape and supplies these signals via respective paths to an output circuit 404 which combines them to from a composite video output signal. So at output 406. The luminance signal to noise ratio is enhanced by inserting the processor 10 (of FIG. 1) in the luminance path which recursively filters low frequency luminance components and cores high frequency chrominance components of the recovered video signal.

Other general applications of the principles of the invention will be apparent. For example, the noise reduction circuit of FIG. 1 may be used in the luminance path of a television camera or the in luminance path of a video special effects generator.

Figure 5:
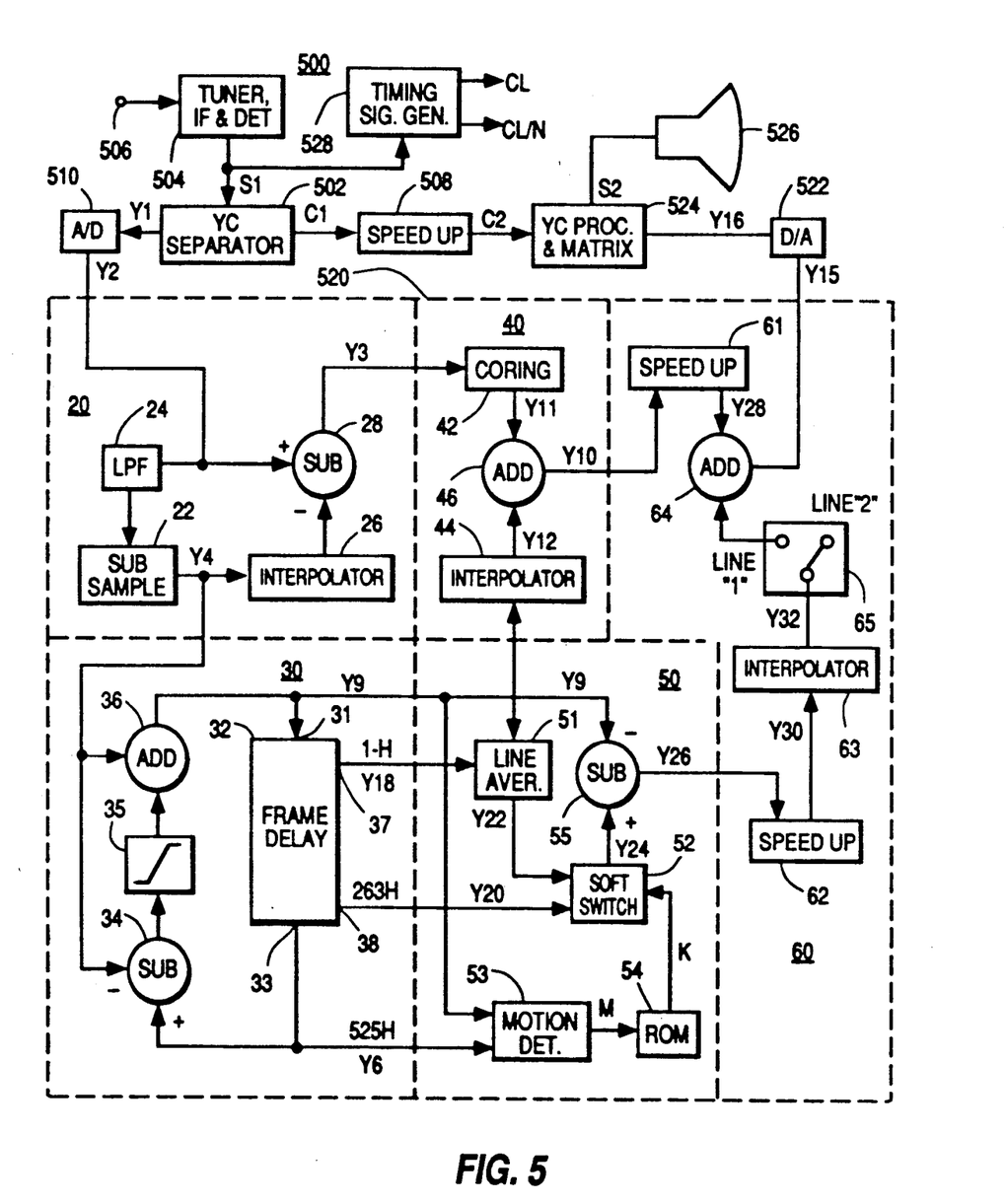
FIG. 5 is a detailed block diagram of a progressive scan processor embodying the invention in a color television receiver.

FIG. 5 is an example of a specific application of the noise reduction circuit of FIG. 1 as applied to a progressive scan processor in a television receiver. As noted above, the noise reduction system of FIG. 1 is of general utility and may be used in video recorders, television receivers and cameras to name a few examples. There is a special application of the principles of the invention, however, where even greater overall memory savings may be achieved through the "shared use" of frame delay unit 32. These "special applications" include applications where it is desired to process a luminance signal in dual frequency bands for purposes other than noise reduction.

As a specific example, progressive scan television receivers have been proposed which convert an interlaced input signal to non-interlaced "progressive scan" form for display. Advantageously, such systems double the number of lines displayed and so reduce the visibility of raster line structure. When the principles of the present invention are applied to progressive scan systems of the specific type employing dual frequency band processing a substantial amount of memory may be saved by employing the same memory for noise reduction as is used in generating delayed signals for progressive scan conversion.

A first example of a "dual band" progressive scan converter is described in the Japanese laid open patent application of Tanaka et al., Kokai No. SHO 58-79379 entitled TELEVISION RECEIVER which was laid open on May 13, 1983. In the Tanaka et al system extra lines for display are produced by combining low frequency components taken from a previous field with high frequency components taken from a current field. The Tanaka et al. system, however, has no provision for motion compensation and so the system is subject to artifacts (e.g., blur) when motion is present.

A second example of a "dual band" progressive scan processor is described by D. H. Willis in U.S. patent application Ser. No. 617,983 entitled PROGRESSIVE SCAN TELEVISION SYSTEM USING LUMINANCE LOW FREQUENCIES FROM PREVIOUS FIELD which was filed Nov. 26, 1990. Willis describes a motion adaptive dual band progressive scan system in which extra lines for display are produced by combining a high frequency component of a currently received line with a low frequency component derived by motion adaptively blending lines derived from the present or previous fields. FIG. 5 herein illustrates an application of the principles of the present invention for providing noise reduction to the motion adaptive dual band progressive scan display system described by Willis.

In more detail, the receiver 500 of FIG. 5 comprises a luminance-chrominance signal separation circuit 502 which separates a composite video input signal S1 into a luminance component Y1 and a chrominance component C1. The input video signal S1 may be provided by a conventional tuner, IF amplifier and detector unit 504 from an antenna or cable input 506 or, alternatively, it may be provided by an auxiliary input terminal or some other suitable source. Separation circuit 502 may be of conventional design such as a comb filter or a combination of high and low pass filters as is well known.

The separated chrominance signal component C1 is applied to a speed-up unit 508 which time compresses and repeats each line thereof to provide a chrominance output signal C2 having double the line rate of the video input signal and in which each line is repeated. Examples of suitable "speed-up" circuits are described later.

The luminance signal Y1 is converted to digital form by means of an analog-to-digital (A/D) converter 510 and the digitized luminance signal Y2 is applied to a luminance signal progressive scan processor 520 (outlined in phantom) which generates a motion adaptive double line-rate progressively scanned luminance output signal Y15 as will be described. This signal is converted back to analog form (Y16) by means of a digital to analog (D/A) converter 522 and the double line-rate signals C2 and Y16 are applied to a conventional luminance-chrominance signal processing unit 524 which provides such functions as color demodulation, brightness and contrast control and color matrixing so as to provide a progressively scanned output signal S2 of a form (e.g., RGB component form) suitable for display by a kinescope 526 or some other suitable display device (e.g., an LCD device or a projection display).

Since the line rate of the output signal S2 is twice that of the input signal S1, the images produced by kinescope 526 have twice as many lines as the input signal whereby the visibility of raster line structure is substantially reduced as compared with conventional interlaced images.

Clock signals CL for converters 510 and 522 (and other timing signals for the receiver 500) are provided by a timing signal generator 528. This generator may comprise a phase locked loop (PLL) generator of conventional design locked to a multiple of the color burst component of the input signal S1 or locked to a multiple of the line frequency of the input signal S1. Typical sampling clock frequencies are three or four times the frequency of the color subcarrier for systems employing what is commonly called "burst locked" clocking. In a presently preferred implementation of the system the timing signal generator 528 is phase locked to a multiple of the horizontal line rate. This is commonly called "line locked" clock generation and has an advantage over burst locking in that the system is usable with so-called non-standard video sources where the relationship between line and burst frequencies may vary. Illustratively, in this specific example of the invention, the clock frequency CL is selected to be 1024 times the horizontal line rate of the video input signal. For NTSC standard sources, this frequency CL is about 16.1 megaHz. Other clock signals provided by timing unit 528 include CL/4 and 2 CL which are used for sample rate conversions as will be explained. Unit 528 also provides horizontal and vertical line rate frequencies used for deflection purposes.

The remaining portion of FIG. 5 comprises the progressive scan processor 520 that provides the motion adaptively processed progressively scanned luminance output signal Y15 which has been subjected to noise reduction in accordance with the invention.

As an overview, it will be noted that with one exception, the noise reduction elements comprising input processor 20, frame recursive filter 30 and output processor 40 are identical in structure and function to the corresponding elements of FIG. 1. The exception is that the frame delay unit 32 in the frame recursive filter 30 is provided with two additional output taps 37 and 38. Tap 37 provides a luminance signal Y18 which corresponds to a one line (1-H) delay of the signal Y9 and tap 38 provides a luminance output signal Y20 which corresponds to a one field delay (263-H) of the noise reduced low frequency luminance signal Y9.

The remaining elements of progressive scan processor 520 comprise a motion adaptive blending processor (40) and a second output processor (50) which process the noise reduced low frequency luminance signals Y6, Y9, Y10, Y18 and Y22 to form a progressive scan output signal having components thereof noise reduced by coring and recursive filtering.

Processor 50 includes a line averager circuit 51 which averages the non-delayed low frequency luminance signal Y9 with the one-line delayed luminance signal Y18 to provide a line averaged luminance signal Y22. A "soft switch" 52 combines the averaged luminance signal Y22 with the field delayed luminance signal Y20 to provide a combined or "blended" luminance output signal Y24 in which the proportions of the Y22 and Y20 components are controlled by motion detector 53 and a control signal generator 54. An example of a suitable soft switch is shown and described later. Motion detector 53 has one input connected to receive the non-delayed luminance signal Y9. It has a second input connected to receive a frame delayed luminance signal Y6 provided by delay unit 32 and provides a motion indicating signal M representative of the difference between signals Y6 and Y9. A suitable motion detector is shown and described later. The purpose of control signal generator 54 is to convert the motion signal M, which is linearly related to motion, to a control signal K which is non-linearly related to motion so as to provide a better match to the motion sensitivity of the human visual system. Examples of suitable control signal generators are shown and described later.

Soft switch 52 responds to the control signal K by selecting the field delayed luminance signal Y2 under conditions of little or no motion (K=0) and selecting the line averaged luminance signal Y22 under conditions of high motion (K=1). For intermediate values of motion the signals Y20 and Y22 are blended in proportion to the non-linear control signal K provided by control signal generator 54.

The resultant "motion adapted" luminance signal Y24 provided by soft switch 50 is applied to the second input of subtractor 55 which receives the non-delayed, sub-sampled and low-pass filtered luminance signal Y9 at its other input and provides a luminance output difference signal Y26. The signal Y26 is a video difference signal representative of a difference between a first low frequency component (Y9) derived from a current line of the video input signal and a second low frequency component (Y24) derived from at least one previous line of the video input signal.

The output circuit 60 of progressive scan processor 520 selectively combines the video difference signal (Y26) with the full bandwidth video input signal Y10 to form the progressive scan video output signal Y15. In output circuit 60 the full bandwidth luminance signal Y10 is applied to a speed-up unit 61 which time compresses and repeats each line thereof to provide a double line-rate luminance output signal Y28 in which each line is time compressed by a factor of two and repeated. The difference signal Y26 produced by subtractor 55 is applied to a luminance signal speed-up unit 62 that time compresses each line thereby doubling the line rate of the difference signal Y26. Doubling the line rate of the sub-sampled signal Y26 also doubles the sample rate (e.g., from 4 to 8 MHz for the assumed clock) of the speeded up signal Y30. The sample rate of signal Y30 is then applied to a sample rate converter comprising an interpolator 63 that quadruples the sample rate of the time compressed signal Y30. Accordingly, for the assumed clock and sub-sampling values, the processed low frequency difference signal Y32 at the output of interpolator 63 equals about 32 MHz which equals the sample rate of the speeded-up broad band luminance signal Y28.

The sample rate equalization or "matching" of the processed luminance signal lows (Y32) and the full bandwidth luminance signal (Y28) allows the direct addition of these signals in adder 64 to form the luminance progressive scan signal Y15. The last step, prior to the addition, is to apply signal Y32 to a switch 65 which is synchronized with the line frequency so as to add one line of the motion adaptively processed low frequency difference signal Y32 to every other line of the full bandwidth double line rate video signal Y28 to produce the progressive scan output signal Y15.

The foregoing description presents the general operation of processor 520 in FIG. 5. The overall operation is relatively complex because it depends on picture content but may be easily understood by considering a few specific examples. As a first example, assume that the video image being processed is a still picture. For this case there is no frame-to-frame difference in pixels (picture elements) and so the output M of motion detector 53 will be zero indicating no motion. Control signal K provided by generator 54 is a non-linear function of M as previously noted. For purposes of illustration it will be assumed that K equals zero for the case where M equals zero. Soft switch 52 will respond to the zero value of control signal K by selecting the field delayed output signal Y20 of frame delay unit 32. Subtractor 55 will thus subtract the field delayed low frequency component Y20 from the current low frequency component Y9 to provide the difference signal Y26. Adder 64 will then add one line of the speeded up and sample rate converted difference signal Y32 (selected by switch 65) to every other line of the speeded up full bandwidth luminance signal Y28 to form the progressive scanned luminance output signal Y15.

As a result of the addition in adder 64, the luminance signal will comprise two components in different frequency bands even though the system employs no high pass filters. A first component, taken from a currently received line, will equal a high frequency component of the full bandwidth signal Y10 for frequencies above the cut-off frequency of low pass filter 24. A second component will equal a low frequency component, selected by filter 24, taken from the previous field. This may be understood by considering that the difference signal Y26 actually comprises two low frequency components (Y9 and Y24) and the phase of a selected one of these components (Y9) is reversed due to the subtraction. Accordingly, ignoring for the moment the speed-up and sample rate conversions, the output signal Y15 equals the full bandwidth luminance signal Y10, minus the non-delayed low frequency component Y9 plus the low frequency component Y24 taken from the previous field. When these signals are combined the low frequency components of the current line of signal Y3 simply cancel out because they are out of phase. The missing lows due to the cancellation are replaced by the lows from the previous field (Y20). Since high frequency components of signal Y2 are subjected only to coring in processor 40, these components of Y3 are not disturbed and form the high frequency component of the output signal Y15.

Briefly summarized, for the still image example, alternate lines of the output signal Y15 comprise the full bandwidth luminance signal Y10 in which the high frequency portion there of has been noise reduced by coring and the low frequency component thereof has been noise reduced by frame recursive filtering. The in-between or "interstitial" lines comprise a high frequency component that has been noise reduced by coring taken from the currently received line (Y2) and a low frequency component (Y20) taken from the previous field and which has been noise reduced by recursive filtering. Accordingly, for this example low frequency video components that are displayed will exhibit the full vertical resolution of a complete video frame. Visually, the effect is to increase the vertical resolution of displayed still images as compared with standard interlaced images and the low frequency recursive filtering provides a signal to noise ratio improvement as well.

As a further example of overall operation of the FIG. 5 system, consider the case in which there is substantial motion in a scene. In this case the soft switch 52 selects only the line averaged low frequency luminance signal Y22 so that the low frequency difference signal Y26 equals the difference between the low frequency component Y9 of a current line and the average Y22 of the low frequency components of the current and a previous line. When these signals are speeded up and converted to the same sample rates in output circuit 60 the resultant sum signal Y15 (for every other line) comprises a low frequency component (noise reduced by recursive filtering) that is equal to the average of the current and previous lines and a high frequency component (noise reduced by coring) that is taken from the current line. For the remaining lines the output equals the current line in which low frequency noise is reduced by recursive filtering and high frequency noise is reduced by coring.

For the case where motion exists between full motion (M=1) and no motion (M=0) switch 52 blends the line averaged signal Y22 and the field delayed signal Y20 to form the signal Y24 which after subtraction of signal Y9 forms the difference signal Y26. As a result, the output signal Y15 includes a high frequency component derived from the currently received line and a low frequency component derived (by motion dependent blending in switch 52) from two lines of the current field and one line of a previous field depending on the degree of the image motion.

In the foregoing discussion of processing of still images in FIG. 1 it was noted that the difference signal Y26 was formed by subtracting Y9 from Y24 and that this resulted in a reversal of the phase of the current low frequency component relative to the phase of the full bandwidth signal Y10 to thereby cancel these components when they are later combined by addition in adder 64. As an alternative, the signal Y24 may be subtracted from Y9 to form the difference signal Y26. This change may be made (e.g., reversing the inputs to subtractor 55) by replacing the adder 64 in output processor 60 with a subtractor connected to subtract the signal Y32 passed by switch 65 from the signal Y28 provided by speed-up unit 61.

Other modifications may be made to the example of FIG. 5. For example, in output processor 60 the positions of the interpolator 63 (which provides sample rate up-conversion) and the speed-up circuit 62 may be reversed in the cascade connection of these two circuit elements. To effect this change all that is required is an appropriate selection of the various clock frequencies. The speed-up circuit, for example requires a read clock that is twice the write clock frequency and the sample rate conversion requires a read clock that is four times the write clock frequency. In the example of FIG. 5 where speed-up is done before sample rate conversion. Specifically, the speed-up circuit receives a write clock frequency of CL/4 (e.g., 4 MHz) and a read clock frequency of CL/2 (e.g., 8 MHz) and the sample rate converter (interpolator 63) receives a write clock frequency of CL/2 (e.g., 8 MHz) and a read clock frequency of 2 CL (e.g., 32 MHz). Where sample rate conversion is done before speed-up the clock frequencies are changed as follows: (1) the write and read clocks for speed-up are changed to CL and 2 CL, respectively, (e.g., 16 and 32 MHz) and (2) the write and read clocks for sample rate conversion are changed to CL/4 and CL, respectively (e.g., about 4 and 16 MHz). The overall operation of the speed-up and sample rate converters provides exactly the same result as in the example of FIG. 5 in that the sub-sampled difference signal Y26, after sample rate conversion and speed-up, is of the same line rate and sample rate as the speeded up full bandwidth luminance signal Y28 and so these signals may be combined to provide the progressively scanned output signal Y15.

Figure 6:
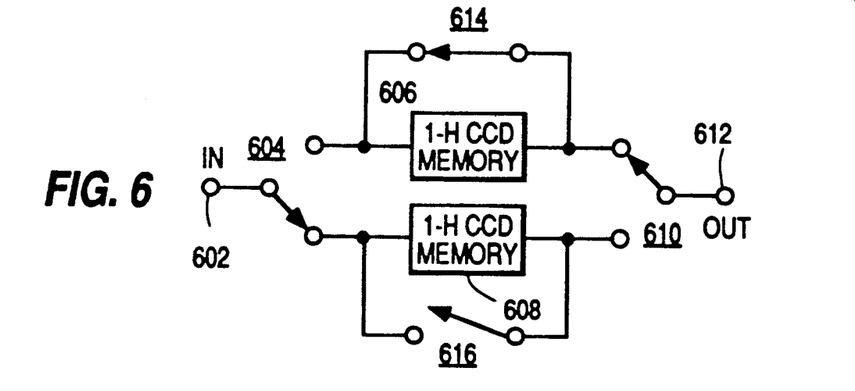
FIGS. 6 and 7 are block diagrams of "speed-up" circuits suitable for use in the receiver of FIG. 5.
Figure 7:
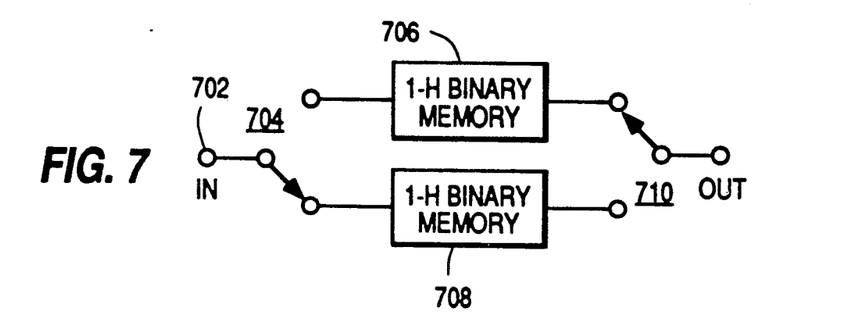

FIGS. 6 and 7 are exemplary of "speed-up" circuits suitable for doubling the line rate of chrominance or luminance input signals in the receiver of FIG. 5. In FIG. 6 video signals to be "speeded-up" at input 602 are alternately applied via a line rate operated "write" switch 604 to a pair of one line (1 H) CCD memories 606 and 608. As one line is being stored in one of the memories the other memory is "read" at double the write clock rate and coupled to an output 612 via a read switch 610. Since the read clock rate is twice the write clock rate the input signal is thereby time compressed and repeated and so the output signal is of double the input signal line rate with each line being repeated. Since CCD memories require refreshing to be read twice, each of the memories 606 and 608 includes a respective "refresh" switch 614 and 616 connected between its input and output terminals which are closed during a read operation to re-circulate the CCD memory contents thereby repeating stored data for the second of the two read cycles of the memory. This particular speed-up circuit may be used for speeding up the chrominance component C1 in the example of FIG. 5 for the case where the signal separation filter 502 provides a chrominance output signal of analog form. Advantageously, this form of speedup circuit accepts analog signals directly without need for analog to digital conversion. Another alternative (for digital input signals) is to use a dual port memory (as discussed later) which is less complex that separately switched one-line memories.

The speed-up circuit of FIG. 7 is similar to that of FIG. 6 but employs digital (binary) memories as storage devices rather than CCD type storage devices. Operation is otherwise the same as in the example of FIG. 6 with the exception that refresh circuits are not required for the digital memory. This type of speed-up circuit may be used directly for the luminance signal processing in processor 60 because the signals there are already of binary form. To use this speed-up circuit for the chrominance signal C1 in the example of FIG. 5, it would be necessary to add an analog-to-digital converter to the input of switch 704 and to add a digital to analog converter to the output (712) of switch 710. This would not be necessary, of course if the signal separation circuit 502 is a digital type of circuit providing output signals that are already of digital form rather than analog form. If the example of FIG. 5 is modified to provide digital signal separation, then analog to digital converter 510 may be eliminated.

Figure 8:
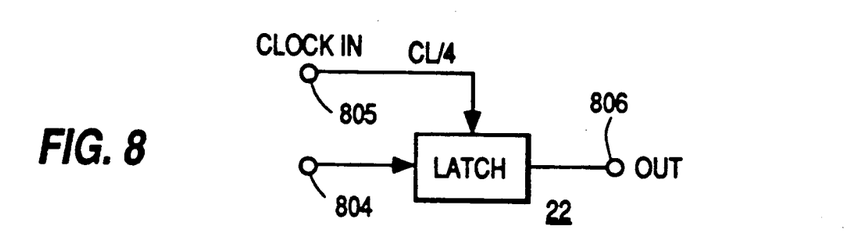
FIG. 8 is a block diagram of a sub-sampling circuit suitable for use in the examples of FIGS. 1 and 5.

FIG. 8 is exemplary of a sub-sampling circuit suitable for use as circuit 22 in processor 20. The circuit comprises a latch 802 having a data input 804 which receives the low pass filtered luminance signal Y2, having a clock input 805 to which the sub-sampling clock signal is applied and having an output 806 providing the sub-sampled output signal Y4. The data latch may be clocked at a rate CL/N where N is a number greater than unity. Preferably, N is an integer such as 2, 3 or 4. As an alternative, N may be an non-integer fraction. The advantage of using integer values for N (which is preferred) is that no interpolation is required to produce the sub-sampled signal. However, non-integer values of N may be employed in a particular system if desired. The presently preferred integer sub-sampling values are 2, 3 and 4.

In the specific embodiment shown herein, for purposes of illustration of the invention, the value of N is chosen to be N=4. For the four-to-one sub-sampling assumed in the example of FIGS. 1 and 5 which both use a clock frequency of CL/4, the latch 802 would discard three out of four samples of the low pass filtered luminance signal. Accordingly, for this sub-sampling value (N=4) the memories required for implementing video delay need be only one-quarter as large as would be required if the video signal were not sub-sampled.

Figure 9:
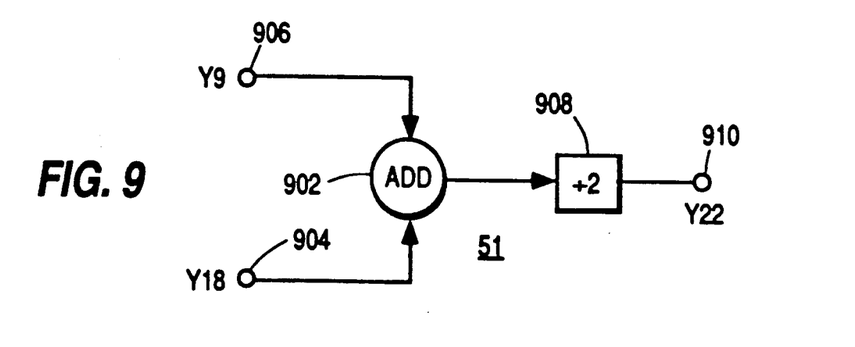
FIG. 9 is a block diagram of an averager suitable for use in the receiver of FIG. 5.

Averager 51 may be implemented as shown in FIG. 9 by applying the non-delayed and 1-H delayed signals to the inputs (904, 906) of an adder 902 and dividing the adder output by two with a divider 908 to thereby provide a line averaged output signal Y22 at output terminal 910. In practice, the divider may be implemented by simply not using the LSB output of the adder and thus providing a one bit shift of the adder outputs. For systems in which the signal processing at this point is done in analog form the divider would be replaced by a 6 dB attenuator and the adder would be replaced by a summing network.

Figure 10A:
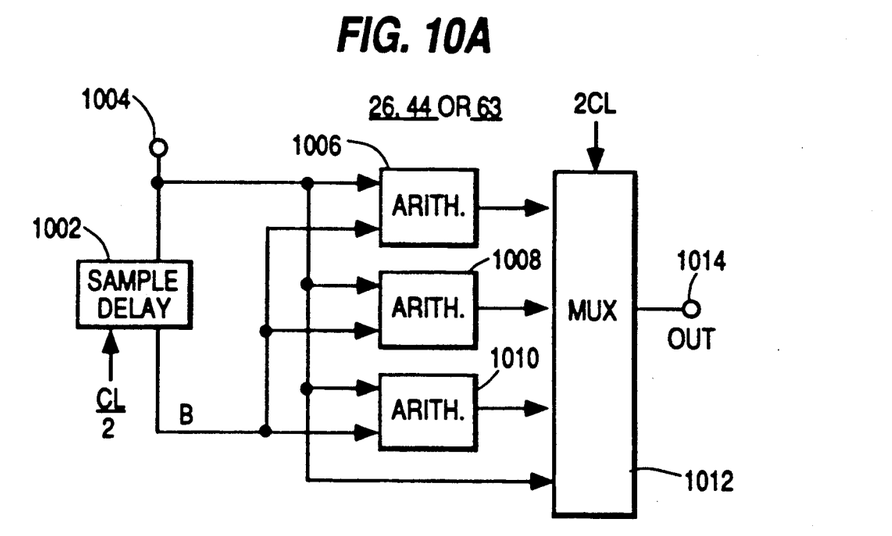
FIGS. 10A and 10B are block diagrams of interpolators suitable for use in the examples of FIGS. 1 or 5.

FIG. 10A is an example of an interpolator which be used for quadrupling the sample rate of the luminance signals Y4, Y9 or Y30. As previously explained, one may provide sample rate up-conversion by simply repeating each sub-sampled pixel four times. Sample rate up-conversion by repeating samples, however, tends to produce images with relative coarse diagonal line structure. Interpolating converters, such as in FIG. 10A (and FIG. 10B discussed later), exhibit smoother diagonal lines but somewhat "softer" horizontal transitions.

In more detail, the interpolator of FIG. 10A includes a sample delay unit 1002 having an input 1004 to which the sub-sampled luminance signal are is applied. Delay unit 1002 also receives a clock signal CL/2 which equals the sub-sampling rate (e.g., 4 MHz) and so imparts a one sample delay to signal at input 1004. The input (A) and output (B) signals of delay unit 1002 are applied to the inputs of three arithmetic units 1006, 1008, and 1010 which generate respective output signals of (3 A+B)/4, (A+B)/2 and (A+3 B)/4. The output signals of arithmetic units 1006, 1008 and 1010 and the input signal of delay unit 1002 are applied to a multiplex (MUX) switch 1012 which sequentially selects the signals at a clock rate of 2 CL. This clock rate is four times the clock rate applied to sample delay unit 1002 and so the interpolated and multiplexed signals provided by switch 1012 to output terminal 1014 have four times the sample rate as the input signal.

Figure 10B:
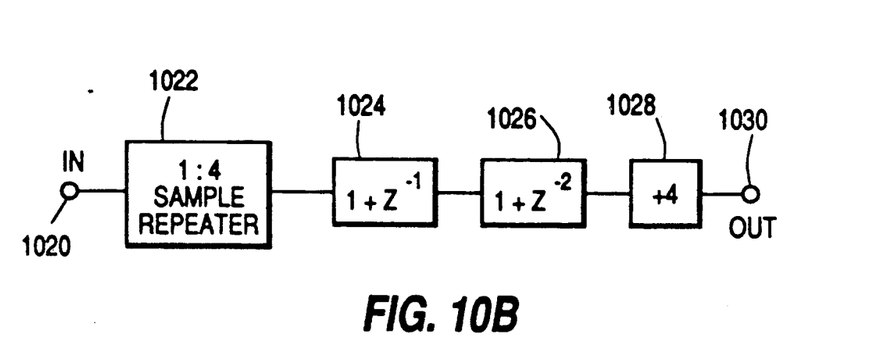
Figure 11:
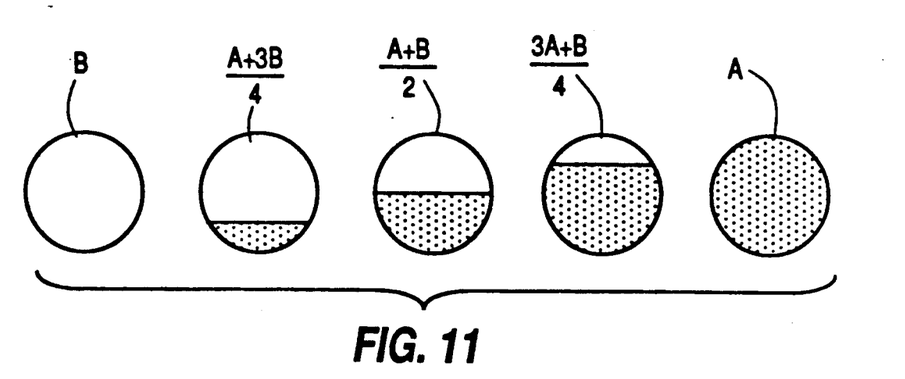
FIG. 11 is a diagram illustrating operation of the interpolators of FIGS. 10A and 10B.

FIG. 11 is a pixel diagram illustrating the operation of the interpolator of FIG. 10A (and FIG. 10B, discussed later) for the case where the currently received pixel A is at black level (e.g., zero IRE units) and the previous pixel B was at white level (e.g., 100 IRE units). As shown, multiplex switch 1012 sequentially selects the arithmetic unit outputs to provide interpolated pixels having luminance levels of (A+3 B)/4, (A+B)/2 and (3 A+B)/4 which lie between the values of the current (A) and previous (B) pixels. Accordingly, a linear approximation of pixel values is produced at four times the input sample rate. As previously noted, the use of interpolation has an advantage in producing smoother diagonal lines that the alternative sample rate conversion method of simply repeating each incoming pixel to quadruple the sample rate.

FIG. 10B is a block diagram of (preferred) alternative form of an interpolating sample rate converter which does not require the use of multipliers as in the arrangement of FIG. 10A. The converter comprises an input terminal 1020 to which luminance signal is applied and an output terminal 1030 at which the 1:4 sample rate interpolated luminance signal is produced. Terminal 1020 is coupled to terminal 1030 via a cascade connection comprising a 1 to 4 sample rate repeater 1022, a first digital filter 1024 having a Z-transform of 1+Z (exp. −1), a second digital filter 1026 having a Z transform of 1+Z (exp. −2) and a divide by four divider 1028. The sample repeater 1022 repeats incoming samples to provide four identical output samples for each sample received. The first digital filter may be implemented as an adder which adds an input sample to a previous sample delayed by one sample interval. No multiplication is required. The second digital filter may be implemented by an adder which adds the output of the first filter to a signal corresponding to the output of the first filter delayed by two sample periods. Again, no multiplication is required. The output of the second filter is scaled down by a factor of four by divider 1028. The output signal thus produced is the same as in the previous example. Advantageously, in this preferred embodiment of the sample rate converter, no multiplication is required at any stage and so the circuit is substantially simplified over that of the previous example.

Figure 12:
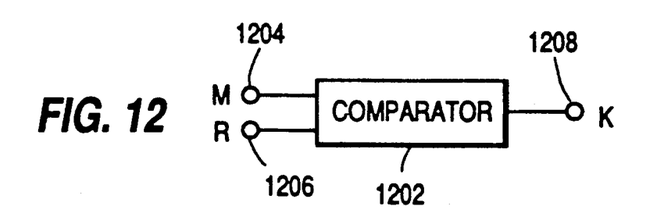
FIGS. 12 and 13 are block diagrams illustrating control signal generators suitable for use in the receiver of FIG. 5.
Figure 13:
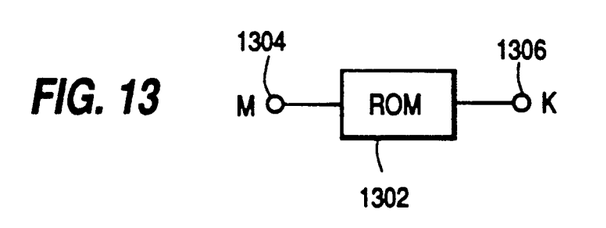
Figure 14:
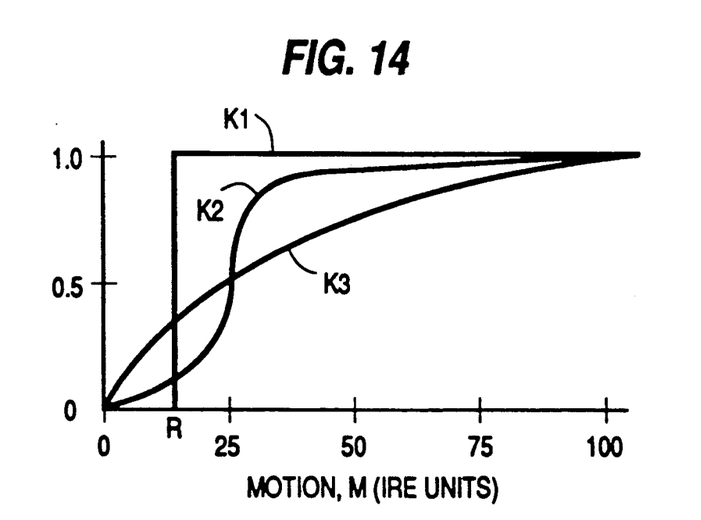
FIG. 14 is a response diagram illustrating operation of the signal generators of FIGS. 12 and 13.

FIGS. 12, 13 and 14 illustrate various alternative implementations and alternative non-linear response characteristics for control signal generator 54. In its most simple form the control signal generator 54 may be implemented, as shown in FIG. 12, by applying the motion indicating signal M to one input 1204 of a threshold detector 1202 which receives a reference signal R at its other input 1206 and provides a binary valued (i.e., on/off) output signal at output 1208 indicating when the motion indicating signal M is above or below the reference signal. This, threshold type of operation is illustrated by response curve K-1 in FIG. 14 where it is seen that for values of the motion signal M below the reference level R the value of the control signal K is zero, otherwise, the value of the control signal K is unity.

FIG. 13 illustrates a preferred implementation of the control signal generator 54 in which the motion indicating signal M is applied to the address inputs 1104 of a read-only memory (ROM) 1302 which provides the control signal K at its output 1306. This generator can produce the threshold response of curve K-1 shown in FIG. 14 and it can also produce other, more complex, non-linear responses illustrated by the response curves K-2 and K-3 in FIG. 14. In the example of response K-2 in FIG. 12 the control signal K changes relatively slowly for small and large values of the motion signal M and changes relatively rapidly for intermediate values of the motion signal M. In the example of response K-3 the control signal increases rapidly for small values of motion and increases less rapidly for larger values of motion. The use of non-linear response curves for control signal generator 54 is preferred over the example of binary valued threshold detection because changes in the curves (e.g., K-2 or K-3) are much less abrupt and thus less noticeable to a viewer of the processed video signal.

Figure 15A:
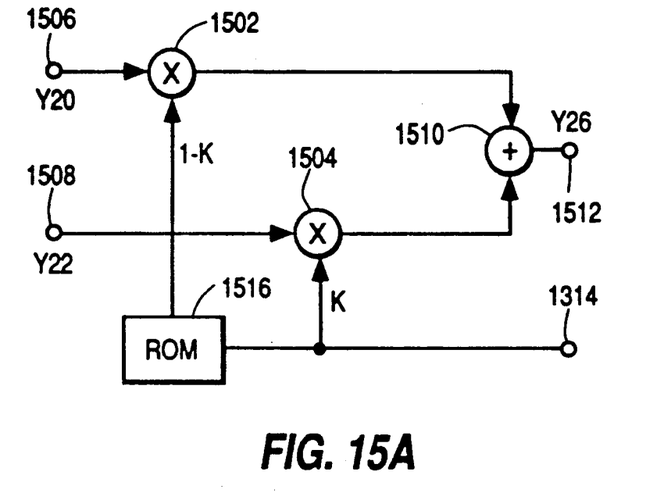
FIGS. 15A and 15B are block diagrams of "soft switches" suitable for use in the receiver of FIG. 5.

FIG. 15A is an example of a suitable implementation of soft switch 52 which comprises a pair of multipliers 1502 and 1504 which receive, respectively, the field delayed (Y20 and the line averaged (Y22) luminance signals at inputs 1506 and 1508 and have outputs connected to an adder 1510 that provides the blended luminance signal Y24 at its output 1512. Multiplier 1504 is controlled directly by the control signal K applied to input 1514 and multiplier 1502 is controlled by a signal equal to $1-K$ provided by a read only memory (ROM) 1516 which is addressed by the control signal K.

In operation, for no motion (K=0) multiplier 1502 passes the field delayed luma signal Y20 to the output via adder 1510 and multiplier 1504 blocks the line averaged luminance signal Y22. For high motion (K=1) the line averaged luminance signal Y22 is passed to the output by multiplier 1504 and adder 1510 and the field delayed luminance signal is blocked by multiplier 1502. For intermediate degrees of motion (0<K<1) the output signal is blended or combined in the proportions of K and 1−K.

Figure 15B:
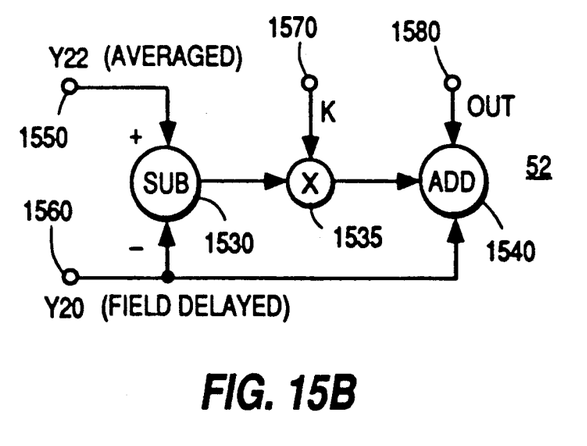

FIG. 15B is a preferred example of a suitable implementation of soft switch 52 which requires only one multiplier. The switch comprises a subtractor 1530 having an output coupled via a multiplier 1535 to one input of an adder 1540. The line averaged luminance signal Y22 at input 1550 is applied to the positive or non-inverting input (+) of subtractor 1530. The field delayed luminance signal Y20 at input 1560 is applied to adder 1540 and to the subtractive (−) input of subtractor 1530. The control signal K is applied to the other input of multiplier 1535.

In operation, when there is no motion (K=0) the field delayed luminance signal Y20 is coupled to the output 1580 via adder 1540. For this case signal Y22 may be ignored because multiplier 1535 blocks the signal Y22 when K equals zero. For the case where there is a lot of motion (K=1) multiplier 1535 couples Y22 and minus Y20 to adder 1530 which receives plus Y20 at its outer input. Accordingly, for this case the Y20 signals, being our of phase, cancel each other and the adder output is signal Y22. For any value of K between the limits one and zero (0<K<1) the output signal comprises Y20 and Y22 blended in accordance with the control signal K.

Figure 16:
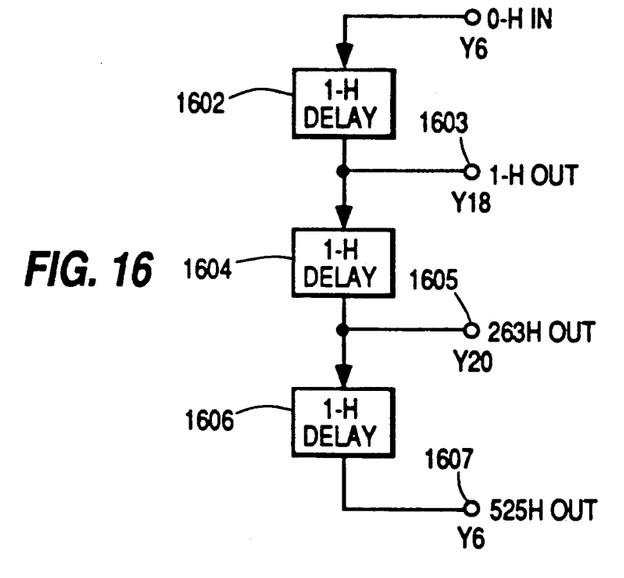
FIGS. 16 and 17 are block diagrams of frame delay units suitable for use in the examples of FIGS. 1 or 5.
Figure 17:
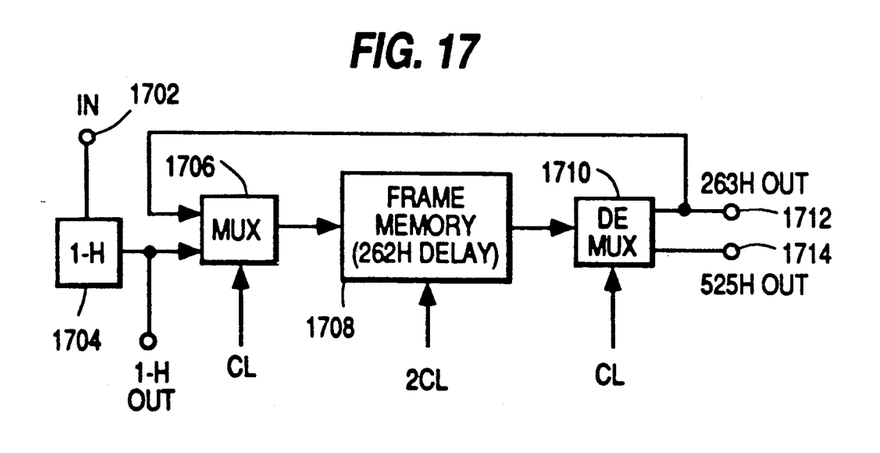

FIGS. 16 and 17 illustrate alternative implementations of delay unit 32 which provides the line delayed output signal Y18, the field delayed output signal Y20 and the frame delayed output signal Y6. The exact delay of these signals depends, as will be readily recognized, on the video transmission standard (e.g., NTSC, PAL or SECAM). In the example of FIG. 16 (where NTSC standard is assumed) the tapped frame delay is implemented by a cascade connection of a 1-H delay 1602, a 262 H delay 1604 and another 262 H delay 1606 thereby providing delayed luminance output signals Y18, Y20 and Y6 at outputs 1603, 1605 and 1607, respectively.

A presently preferred implementation of delay unit 32 is shown in FIG. 17 in which the signal to be delayed is applied to the input 1702 of a 1-H delay unit 1704 and thence, via a multiplex switch 1706, to a memory 1708 that has a memory capacity of one frame and that provides a total delay of a field. The output of frame memory 1708 is applied to a de-multiplex switch 1710 that provides a field delayed output signal at terminal 1712 and a frame delayed output signal at terminal 1714. The field delayed output signal is coupled back to the other input of switch 1706 and is thereby interleaved with the frame delayed signal in the memory 1708. By this means, the contents of memory comprise interleaved field and frame delayed signals which are separated at the output by means of the demultiplex switch 1710. Further details of this example of tapped frame delay unit 42 are presented in U.S. Pat. No. 4,639,783 of R. T. Fling entitled VIDEO SIGNAL FIELD/FRAME STORAGE SYSTEM which issued Jan. 27, 1987.

Figure 18:
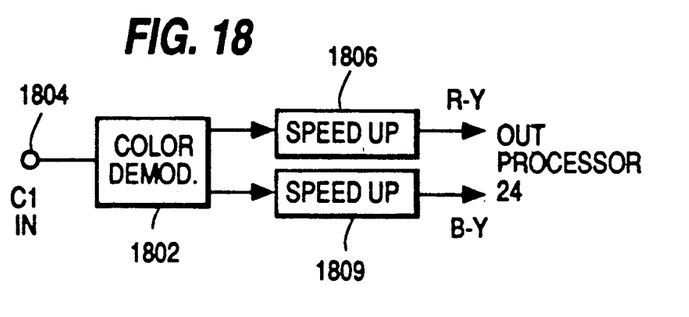
FIG. 18 is a block diagram illustrating modification of the chrominance signal processing in the example of FIG. 5.

FIG. 18 illustrates a modification of the color signal processing in the receiver of FIG. 5 wherein the separated chrominance signal C1 provided by separator 502 is applied to the input 1804 of a color demodulator 1804 which provides demodulated (baseband) output color signals (e.g., R-Y and B-Y) to respective speed-up units 1806 and 1808 which supply double line rate demodulated chrominance signals to the YC processor and matrix unit 24. Demodulation of the chrominance signal prior to speed-up, as shown in this example, does require two color speed-up circuits but is presently preferred as having the advantage of performing the demodulation at a lower clock frequency than would otherwise be required if the color demodulation were done after speed-up as in the previous example.

Figure 19:
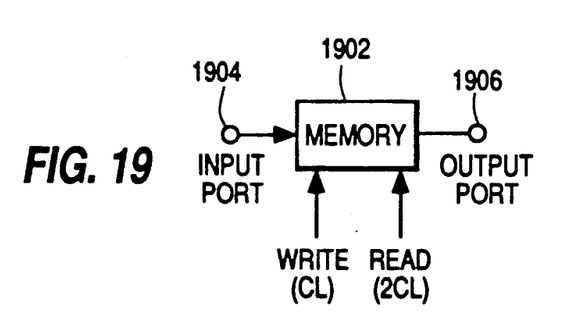
FIG. 19 is a block diagram of a further "speed-up" circuit suitable for use in the receiver of FIG. 5.
Figure 20:
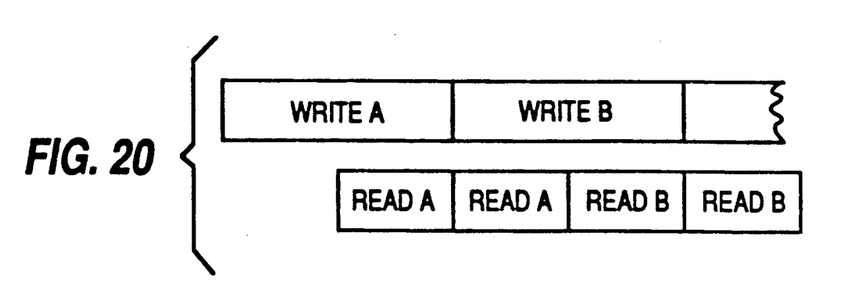
FIG. 20 is a diagram illustrating operation of the speed-up circuit of FIG. 19.

FIG. 19 is exemplary of another speed-up circuit suitable for use in the receiver of FIG. 5 which employs a random access memory 1902 of the dual port type having an input port 1904 for receiving a digital signal to be speeded up and an output port 1906 providing the speeded-up video output signal. This type of memory allows read and write operations to occur essentially at the same time which is illustrated in FIG. 20. As shown incoming lines A and B are stored in the memory in response to the write clock (CL). The start of the first line A read cycle starts half-way through the line A write cycle. Reading is done at twice the write clock rate and so line A is time compressed by a factor of two. The start of the second line A read cycle begins upon completion of the line A write cycle and at the beginning of the line B write cycle. The use of dual ported memories is presently preferred in that it is less complex that the other examples discussed. It will also be noted that the delay involved between the start of a write cycle and the start of the first corresponding read cycle is only half of one line rather than a full line as in the previous examples.

Various other changes may be made to the embodiments described herein other than those specifically enumerated and described above. For example, it is not necessary that any of the signal processing be done by the preferred method of digital signal processing. Suitable delays may be provided by other methods such as by use of CCD devices as have been described. Arithmetic operations for analog embodiments may be implemented by analog devices such as operational amplifier, resistive summing networks and the like. The invention, as defined by the following claims includes all analog and digital alternatives to the specific elements described.

What is claimed is:

1. A progressive scan system, comprising:
   a source for providing a video input signal of a given line rate;
   a first processor coupled to said source for providing a first video output signal having a high frequency component subjected to coring and having a first low frequency component subjected to frame recursive filtering, said first processor having a plurality of further outputs providing a plurality of further low frequency, sub-sampled and frame recursively filtered components of said video input signal having differing delays relative to said first low frequency component;
   a second processor coupled to receive said first low frequency component and said plurality of further low frequency components and having an output providing a video difference signal representative of a difference between a first of said components derived from a current line of said video input signal and a second of said further components derived from at least one previous line of said video input signal; and
   an output circuit for selectively combining said video difference signal and said first video output signal to form a progressive scan video output signal of double said given line rate.

2. Progressive scan processing apparatus, comprising:

a source for providing a digital video input signal of a given line rate;

a first processor coupled to said source for separating said video input signal into a high frequency component and a sub-sampled low frequency component;

a second processor coupled to said first processor and responsive to said sub-sampled low frequency component for providing a frame recursively filtered first output signal, a line-delayed frame recursively filtered second output signal, a field-delayed frame recursively filtered third output signal and a frame-delayed frame recursively filtered fourth output signal;

a third processor coupled to said first and second processors for combining said high frequency component and said frame recursively filtered output signal to provide a noise reduced video output signal having a low frequency component subjected to frame recursive filtering and a high frequency component subjected to coring;

a fourth processor coupled to said second processor and responsive to said first, second, third and fourth output signals for providing a noise reduced difference video signal representative of a difference between a first low frequency component derived from a current line of said video input signal and a second low frequency component derived from at least one previous line of said video input signal; and a fifth processor coupled to said third and fourth processors for selectively combining said noise reduced video difference signal and said noise reduced video output signal to form a progressive scan video output signal of double said given line rate.

3. A progressive scan processor, comprising:

a source for providing a luminance input signal;

a low pass filter coupled to said source for providing a low pass filtered luminance output signal;

a delay circuit coupled to said filter for providing a filter delayed low pass filtered luminance output signal;

an output circuit coupled to said source and to said delay circuit and having an output providing a luminance output signal of double the line rate of said luminance input signal and in which every other line of said luminance output signal comprises a high frequency component derived from said luminance input signal and a field delayed low frequency component derived from said luminance input signal; and a noise reduction circuit connected to said source, to said low pass filter and to said delay circuit for recursively filtering said low frequency component of said luminance output signal and for coring said high frequency component of said luminance output signal.

* * * * *